(12) United States Patent
Chang et al.

(10) Patent No.: US 11,816,002 B2
(45) Date of Patent: Nov. 14, 2023

(54) METHOD FOR A DATA BACKUP UNIT TO INTELLIGENTLY CHARGE A MOBILE DEVICE

(71) Applicant: Vinpower Inc., Alhambra, CA (US)

(72) Inventors: Calvinson Chang, Alhambra, CA (US); Stanley Chu, Alhambra, CA (US); Chihhan Chou, Alhambra, CA (US)

(73) Assignee: VINPOWER INC., Alhambra, CA (US)

( * ) Notice: Subject to any disclaimer, the term of this patent is extended or adjusted under 35 U.S.C. 154(b) by 297 days.

(21) Appl. No.: 17/474,608

(22) Filed: Sep. 14, 2021

(65) Prior Publication Data
US 2023/0077858 A1 Mar. 16, 2023

(51) Int. Cl.
| G06F 11/14 | (2006.01) |
| G06F 1/3212 | (2019.01) |
| H02J 7/00 | (2006.01) |
| G06F 8/61 | (2018.01) |
| G06F 11/30 | (2006.01) |
| G06F 1/28 | (2006.01) |
| G06F 1/30 | (2006.01) |

(Continued)

(52) U.S. Cl.
CPC ........ *G06F 11/1461* (2013.01); *G06F 1/3212* (2013.01); *G06F 8/61* (2013.01); *G06F 11/3062* (2013.01); *H02J 7/0048* (2020.01); *H02J 7/007182* (2020.01); *G06F 1/03* (2013.01); *G06F 1/28* (2013.01); *G06F 9/4451* (2013.01); *G06F 11/3013* (2013.01); *G06F 2201/80* (2013.01); *H02J 7/00045* (2020.01); *H02J 2207/30* (2020.01)

(58) Field of Classification Search
CPC . G06F 1/28; G06F 1/30; G06F 1/3212; G06F 11/1461; G06F 11/3013; G06F 11/3062; G06F 2201/80; G06F 8/61; G06F 9/4451; H02J 2207/30; H02J 7/00045; H02J 7/0048; H02J 7/007182
See application file for complete search history.

(56) References Cited

U.S. PATENT DOCUMENTS 9,800,291 B1 * 10/2017 Ben David ......... G06F 11/1415
2014/0100671 A1 * 4/2014 Losee .................. H02J 3/14
                                            700/22
2015/0288215 A1 * 10/2015 Zhang ................. H04B 5/0037
                                            320/108

FOREIGN PATENT DOCUMENTS

| TW | 201404002 | 1/2014 |
| TW | M486890 | 9/2014 |

(Continued)

*Primary Examiner* — Terrell S Johnson
(74) *Attorney, Agent, or Firm* — Muncy, Geissler, Olds & Lowe

(57) ABSTRACT

After a data backup unit connects to a mobile device, an App executed on the mobile device will create a user profile block in the memory unit of the data backup unit, help set up charging preferences and backup preferences in the profile block, and create a backup folder to store backup files from the mobile device. The App estimates a charging time required to charge the battery, a backup time required to complete the data backup and an available time interval, then the App sums up the charging time and the backup time to get a required time interval. Then, the App compares the required time interval and the available time interval to decide whether to perform both the backup task and the charging task or to perform just the charging task.

9 Claims, 7 Drawing Sheets

(51) Int. Cl.
*G06F 9/445* (2018.01)
*G06F 1/03* (2006.01)

(56) References Cited

FOREIGN PATENT DOCUMENTS

| TW | 202028999 | 8/2020 |
| TW | 1736834 B | 8/2021 |

\* cited by examiner

METHOD FOR A DATA BACKUP UNIT TO INTELLIGENTLY CHARGE A MOBILE DEVICE

BACKGROUND OF THE INVENTION

1. Field of the Invention

The present invention relates to a method for charging a mobile device, especially a method for a data backup unit to intelligently charge a mobile device.

2. Description of the Related Art

Mobile phones or tablets, collectively "Mobile Devices", have become an indispensable part of modern life. Statistically, the amount of data stored in a mobile device is increasing day by day. Therefore, backing up data stored on a mobile device has become a routine chore that a mobile device user must face. Nevertheless, charging a mobile device battery is also an essential daily routine to normally operate the mobile device. Therefore, a shortened charging time and a lower charging cost are both constantly demanded by mobile device users.

Hence, there are urgent needs for intelligent charging methods well adopted to reduce time and costs, and there are also urgent needs for seamlessly incorporating both the action of charging and the action of data backup, so that common users of mobile devices can effortlessly utilize both functionalities in one act.

SUMMARY OF THE INVENTION

In view of the above-mentioned needs, the main purpose of the present invention is to provide a data backup unit to automatically back up files while intelligently charging a mobile device, and the method for a data backup unit to intelligently charge a mobile device of the present invention is as follows.

Firstly, provide a data backup unit, and an application program (abbreviated as App, hereinafter) executed on a mobile device. The data backup unit includes a memory unit which includes charging preferences and backup preferences and the mobile device includes a battery, and the method for a data backup unit to intelligently charge a mobile device of the present invention includes the following steps:

S1: The App determines whether the mobile device has ever connected with the data backup unit; if the mobile device has ever connected with the data backup unit, the flow jumps to S2;

S11: The App creates a user profile block in the memory unit of the data backup unit, and sets up the backup preferences and the charging preferences in the user profile block;

S2: The App determines whether the mobile device has ever backed up files in the charging unit; if the mobile device has ever backed up files in the charging unit, the flow jumps to S3; and S2_1: The App creates a new backup folder in the memory unit;

S3: The App determines whether a present charge level of the battery provided by the mobile device is lower than a minimum charge level set by the charging preferences, and if the present charge level is higher than or equal to the minimum charge level, the flow jumps to S5;

S4: The App determines whether power-off mode is ongoing, and if power-off mode is ongoing, the App enters a power-on mode routine; waits for one unit charging time, and then the flow jumps to step S3;

S5: According to the charging preferences, the App estimates a charging time required to charge the battery to the maximum charge level and estimates a backup time required to complete the data backup, and then sums up the charging time and the backup time to get a required time interval;

S6: The App calculates an available time interval which is equal to a time difference between a current time provided by the mobile device and a usage starting time set by the charging preferences;

S7: The App determines whether the required time interval is less than the available time interval, and if the required time interval is greater than or equal to the available time interval, the flow jumps to S9, otherwise, if the required time interval is less than the available time interval, the flow jumps to S8;

S8: The App backs up files to be backed up for the mobile device for a unit backup time.

S8-1: The App determines whether the file backup is done, and if the file backup is not yet done, the flow jumps to step S8-3;

S8-2: The App determines whether to set the files been backed up as read-only according to the backup preferences; and the App determines whether to set the files been backed up with password protection according to the backup preferences; the flow jumps to step S9;

S8-3: The App determines whether the present charge level is lower than the minimum charge level, and if the present charge level of the battery is higher than or equal to the minimum charge level, the flow jumps to S8-5;

S8-4: The App determines whether power-off mode is ongoing, and if power-off mode is ongoing, the App enters the power-on mode routine; waiting for one unit charging time, and then the flow loops back to step S8-3;

S8-5: The App starts to execute a power ON/OFF mode setting routine, and then the flow jumps to step S8;

S9: The App starts to execute the power ON/OFF mode setting routine, and then the flow jumps to step S10; and S10: The App waits for one unit charging time, and then the flow loops back to step S9.

Preferably, the power ON/OFF mode setting routine includes the following steps:

SR1: The App determines whether an off-peak charging option is FALSE or the current time is within an off-peak time interval, and if the off-peak charging option is FALSE or the current time is within the off-peak time interval, the flow jumps to step SR3;

SR2: The App stops the data backup unit from charging the mobile device, and next exits the power ON/OFF mode setting routine;

SR3: The App determines whether the present charge level is less than or equal to the maximum charge level, and if the present charge level is larger than the maximum charge level, the flow jumps to step SR2;

SR4: The App enters the power-on mode routine, and next exits the power ON/OFF mode setting routine.

Preferably, the power on mode routine includes the following actions:

The App determines whether a rapid charging option set by the charging preferences is TRUE, and if the rapid charging option is TRUE, charge the battery under a rapid charging mode, otherwise if the rapid charging option is FALSE, charge the battery under a normal charging mode.

Preferably, the charging preferences include a maximum charge level data, a minimum charge level data, a mobile device usage starting time data, an off-peak time interval data, an off-peak charging option, and a rapid charging option.

Preferably, the following steps are further included before step S1:
- S0_0: The mobile device is connected to the data backup unit and the connection is authenticated;
- S0_1: The mobile device decides whether the App has been installed, if the App is installed on the mobile device, then the mobile device executes step S1;
- S0_2: The mobile device reminds the user of the mobile device to install the App.

Preferably, when the App creates a user profile block in the memory unit of the data backup unit, the App also writes an identification code of the mobile device into the user profile block.

Preferably, when the App creates a backup folder, the App also creates a backup folder pointer in the user profile block to point to the backup folder.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
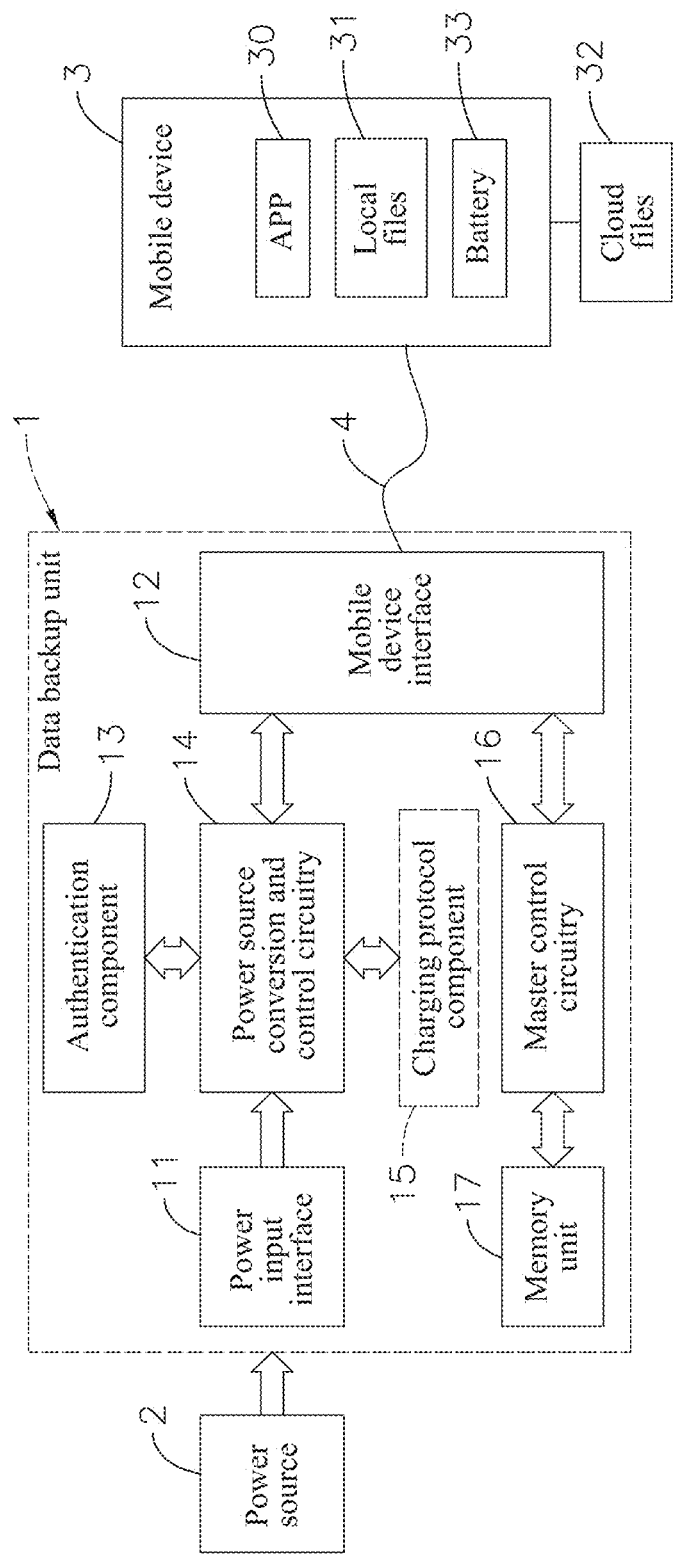
FIG. 1 is a schematic diagram of the data backup unit of the present invention.

FIG. 1 is a schematic diagram of the data backup unit 1 of the present invention. The data backup unit 1 of the present invention includes a power input interface 11, a mobile device interface 12, an authentication component 13, a power conversion and control circuitry 14, a charging protocol component 15, a master control circuitry 16, and a memory unit 17.

The power input interface 11 is used to connect to a power source 2. The power input interface 11 can be compatible with connection interfaces such as Universal Serial Bus (USB) TYPE A, USB TYPE C, or Lightning, etc. The mobile device interface 12 is used to connect a first end of a cable 4, while a second end of the cable 4 is connected to a mobile device 3. The mobile device interface 12 can be compatible with USB TYPE A, USB TYPE C, or Lightning, etc. In this way, the data backup unit 1 of the present invention is connected to the mobile device 3 via the cable 4, and the data backup unit 1 of the present invention can provide power to the mobile device 3. The cable 4 can be a mobile device cable for charging and data transmission, such as a USB_A to Lightning cable, a Lightning to USB_C cable, a USB_A cable, a USB_C cable, a Lightning cable, or a USB_A to USB_C cable, etc.

The authentication component 13 can be an integrated circuit (IC), which is used for the mobile device 3 to authenticate the data backup unit 1 of the present invention. For example, the authentication component 13 may be an MFi (Made For iPhone/iPod/iPad) chip, so that an Apple® mobile device 3 can authenticate the data backup unit 1 of the present invention as a qualified device through the MFi chip when the data backup unit 1 is connected to the Apple® mobile device 3. The power conversion and control circuitry 14 communicates with the mobile device 3 in cooperation with the charging protocol component 15 and outputs appropriate voltage and current to the mobile device 3 to charge a rechargeable battery 33 (abbreviated as a battery, hereinafter) of the mobile device 3.

The cable 4 can be used to transmit data and power. The master control circuitry 16 communicates with the mobile device 3 via the mobile device interface 12 and the cable 4, so that the mobile device 3 can back up its data to the memory unit 17. The master control circuitry 16 can be a microcontroller, a central processing unit (CPU), a programmable logic array (FPGA) or an application-specific integrated circuit (ASIC). The memory unit 17 can be static memory (SRAM), dynamic memory (DRAM), magnetic memory (MRAM), flash memory (FLASH memory), etc., or a combination thereof. Moreover, the memory unit 17 can also be an external memory device, such as a hard disk drive (HDD), a solid state drive (SSD), an SD memory card, a USB flash drive, and so on.

Figure 2:
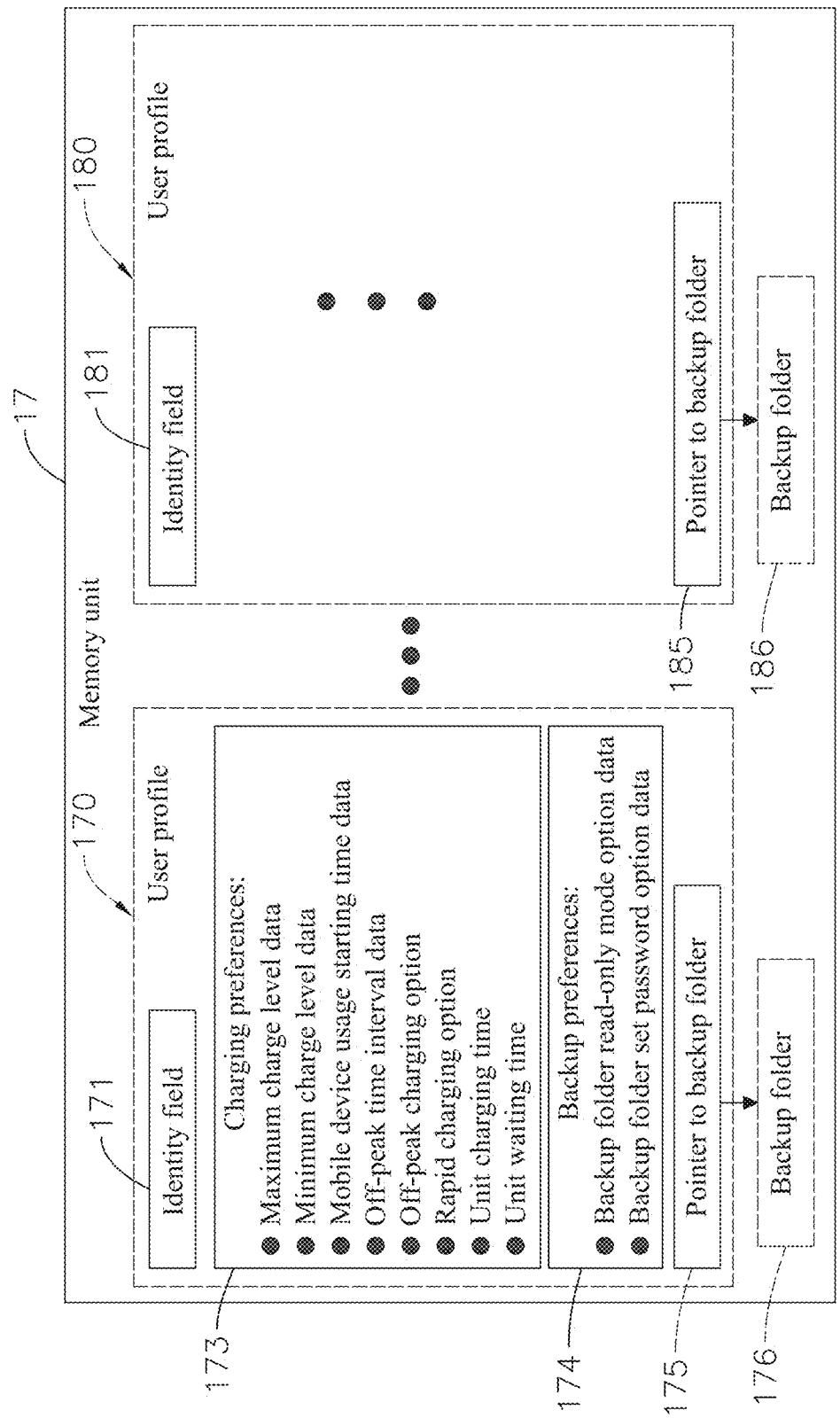
FIG. 2 shows the contents of the memory unit of the data backup unit of the present invention.

FIG. 2 shows the contents of the memory unit 17. The memory unit 17 is used to store information of multiple mobile devices 3, wherein, with respect to each mobile device 3, a user profile block 170 corresponding to a respective mobile device 3 is created in the memory unit 17. The user profile block 170 includes an identity field 171 for storing an identification code of the mobile device 3, such as a mobile handset International Mobile Equipment Identity (IMEI) number, charging preferences 173, backup preferences 174, and a backup folder pointer 175 specifically for the respective mobile device 3. The backup folder pointer 175 points to a backup folder 176 which is also specifically for the respective mobile device 3. The charging preferences 173 include a maximum charge level data and a minimum charge level data for the battery 33 of the mobile device 3, a mobile device usage starting time data, an off-peak time interval data, an off-peak charging option, a rapid charging option, a unit charging time, and a unit waiting time. The backup preferences include a backup folder read-only option data, and a backup folder password option data.

A maximum charge level is set by the maximum charge level data to indicate completion of battery charging for the mobile device 3, for example 95-99%; and a minimum charge level is set by the minimum charge level data to indicate the battery 33 of the mobile device 3 has minimum energy required to complete the data backup operation for the mobile device 3, for example 50-60%; and a usage starting time is set by the mobile device usage starting time data to indicate the starting time expected by the user to use the mobile device in the beginning of a day, for example 7:00 AM; and an off-peak time interval is set by the off-peak time interval data to indicate an off-peak discount period, for example 10:00 PM-7:00 AM, during which users may save utility costs.

Moreover, the off-peak charging option has two values TRUE and FALSE, if the off-peak charging option is TRUE, then charging the mobile device battery during the off-peak time interval shall be preferred; otherwise, there is no preferred time restriction for charging the mobile device. The rapid charging option has two values TRUE and FALSE, if the rapid charging option is TRUE, then charging the mobile device battery shall be carried out in a rapid charging mode; otherwise, charging the mobile device battery shall be carried out in a normal charging mode. Whether the mobile device supporting the rapid charging mode or not depends on intrinsic functionalities of the mobile device and charging cables, and a user needs to figure out whether the mobile device and charging cables support the rapid charging mode. Examples for rapid charging technologies are USB Power Delivery (USB PD) and Quick Charge® (QC), etc. Those mobile devices that do not support the rapid charging mode shall support the normal charging mode which is a basic charging function, yet provides less output power than the rapid charging mode does.

In addition, the backup folder 176 of the memory unit 17 stores the backup data of the mobile device 3 such as local files 31 and cloud files 32. In FIG. 2, there are multiple user profile blocks 170, 180, which respectively include backup folder pointers 175, 185 pointing to backup folders 176, 186, respectively. Accordingly, the data backup unit 1 can provide data backup functions for multiple mobile devices.

Please refer to FIGS. 3A-3D. FIGS. 3A-3D are about the flow of the method for a data backup unit to intelligently charge a mobile device of the present invention. The mobile device 3 must execute an application program (abbreviated as App, hereinafter) 30 to intelligently charge a mobile device and automatically back up the data accessible from the mobile device 3 to the memory unit 17 of the data backup unit 1.

Figure 3A:
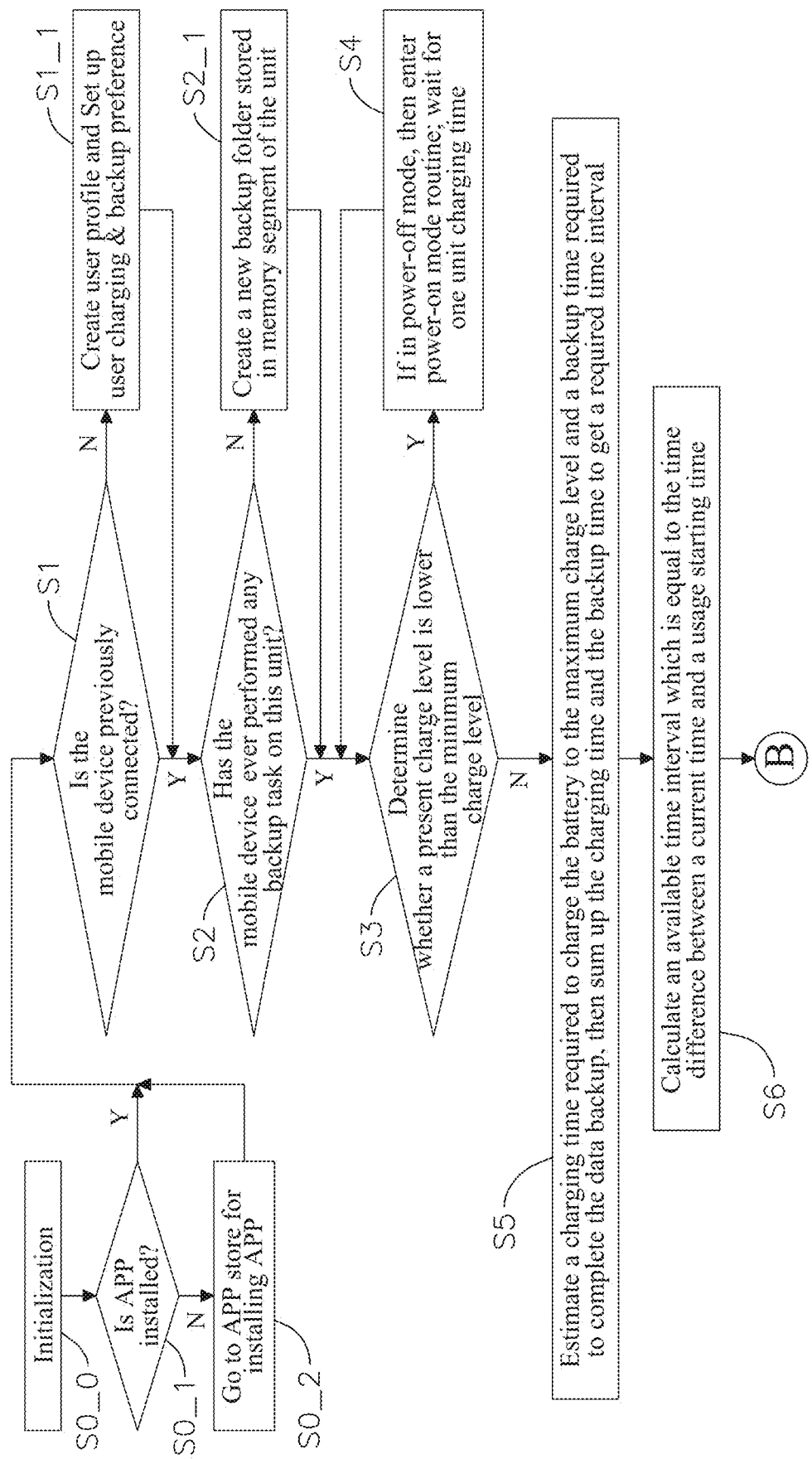
FIGS. 3A, 3B, 3C, 3D, and 3E are flowcharts for the method for a data backup unit to intelligently charge a mobile device of the present invention.

In the initialization step 0_0 (S0_0) in FIG. 3A, the mobile device 3 must be connected to the data backup unit 1 via the cable 4, and then the mobile device 3 is recognized by the data backup unit 1 via the authentication component 13 and the power conversion and control circuitry 14. Then, the App 30 is able to control the data backup unit 1 to supply power to the mobile device 3. Wherein the data accessible from the mobile device 3 includes local files 31 and cloud files 32.

Then, in step 0_1 (S0_1) in FIG. 3A, the mobile device 3 decides whether the App 30 has been installed. If the mobile device 3 has not yet installed the App 30, then in step 0_2 (S0_2) in FIG. 3A, the mobile device 3 shall remind the user of the mobile device 3 to install the App 30.

After the mobile device 3 confirms that the App 30 has been installed, then in step 1 (S1) in FIG. 3A, the App 30 shall confirm whether the mobile device 3 has ever connected with the data backup unit 1; for example, the App 30 searches and compares all user profile blocks 170, 180, etc. in the memory unit 17 of the data backup unit 1 to confirm whether the content of the identity field 171 or the content of the identity field 181 is the same as that of the identification code of the mobile device 3, such as an IMEI number, so as to confirm whether the mobile device 3 has ever used the data backup unit 1. If the mobile device 3 has not used the data backup unit 1, then in step 1_1 (S1_1) in FIG. 3A, the App 30 generates a user profile block 170 in the memory unit 17 of the data backup unit 1, and the App 30 writes the identification code of the mobile device 3, such as the IMEI number, to the identity field 171 of the profile 170. Moreover, the user is also required to set the charging preferences 173 and the data backup preferences 174, and then go to the next step; and if the mobile device 3 has ever connected with the data backup unit 1 before, go to the next step.

In step 2 (S2) in FIG. 3A, the App 30 shall confirm whether the mobile device 3 has ever backed up data in the data backup unit 1. For example, the App 30 searches the corresponding user profile block 170 in the memory unit for whether there is a backup folder pointer 175, so as to confirm that the mobile device 3 has backed up data in the data backup unit 1. If the mobile device 3 has not backed up data in the data backup unit 1, then as shown in the figure in step 2_1 (S2_1), the App 30 generates a backup folder 176 in the memory unit 17 of the data backup unit 1, and create a backup folder pointer 175 in the user profile block 170 to point to the newly generated backup folder 176, and then go to the next step; and if the mobile device 3 has backed up data in the data backup unit 1, go to the next step.

Next, in step 3 (S3) in FIG. 3A, the App 30 shall read a present charge level of the battery 33 of the mobile device 3 from the mobile device 3 and determine whether said present charge level of the battery is lower than the minimum charge level. If the present charge level of the battery is lower than the minimum charge level, the flow jumps to step 4 (S4), otherwise, if the present charge level of the battery is higher than or equal to the minimum charge level, the flow jumps to step 5 (S5).

Next, in step 4 (S4) of FIG. 3A, the App 30 shall determine whether a power-off mode is ongoing, and if the power-off mode is ongoing, the App enters a power-on mode routine; next, the App 30 waits for one unit charging time, and then the flow loops back to step 3 (S3). Wherein the power-off mode denotes that the App 30 stops the data backup unit from charging the mobile device. The power-on mode routine is discussed later.

Then, in step 5 (S5) in FIG. 3A, based on the rapid charging option in charging preferences 173, the App 30 shall estimate a charging time which is required for the data backup unit 1 to charge the battery 33 of the mobile device 3 from the present charge level to the maximum charge level; for example, if an estimated energy of 0.054 MJ (Mega Joule) is required to charge the battery from the present charge level to the maximum charge level, and the charging modes are known to be an output of 5 W for a normal charging mode and an output of 10 W for rapid charging mode, then the estimated charging time is 3 hours/1.5 hour respectively; the App 30 also estimates a backup time for the data backup unit 1 to complete the data backup for files to be backed up from the mobile device 3, for example, for an estimated 24 GB (Giga Byte) data to be backed up, and the data transmission rate is known to be 40 MB (Mega Byte) per second, then the estimated backup time is 10 minutes. Finally, the App 30 sums up the charging time and the backup time, but not limited to such operation, to get a required time interval which is the estimation time interval to complete both tasks of charging and data backup.

Next, in step 6 (S6) of FIG. 3A, the App 30 shall calculate an available time interval which is equal to the time difference between a current time and the usage starting time.

Figure 3B:
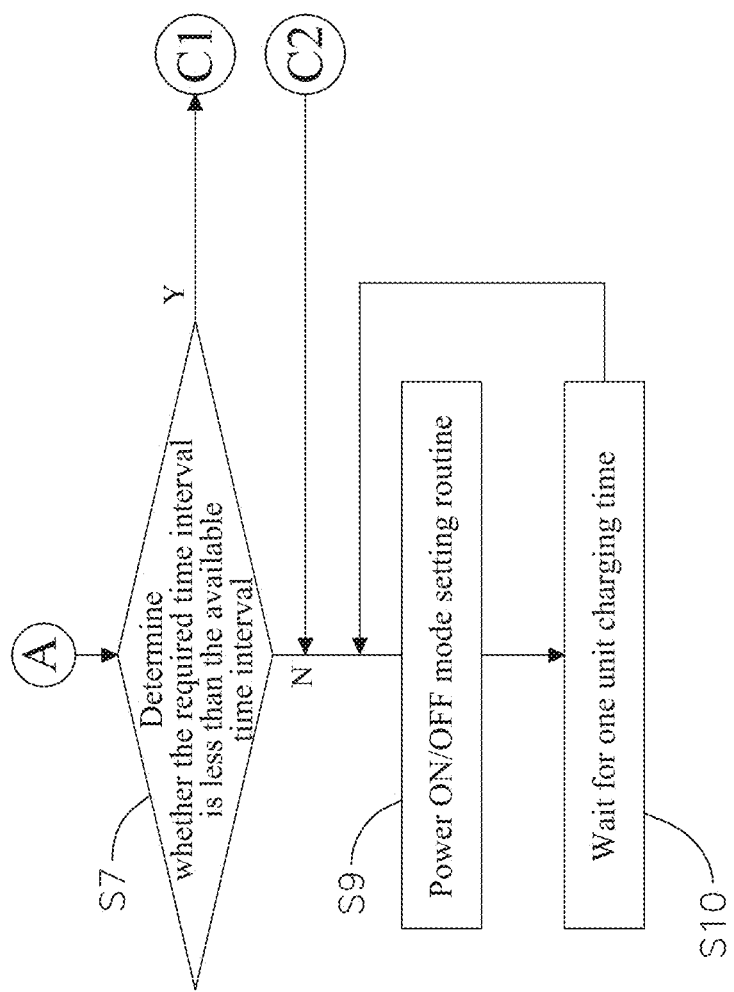

Next, in step 7 (S7) of FIG. 3B, the App 30 determines whether the required time interval is less than the available time interval, and if the required time interval is less than the available time interval, the flow jumps to step 8 (S8), and if the required time interval is greater than or equal to the available time interval, the flow jumps to step 9 (S9).

Figure 3C:
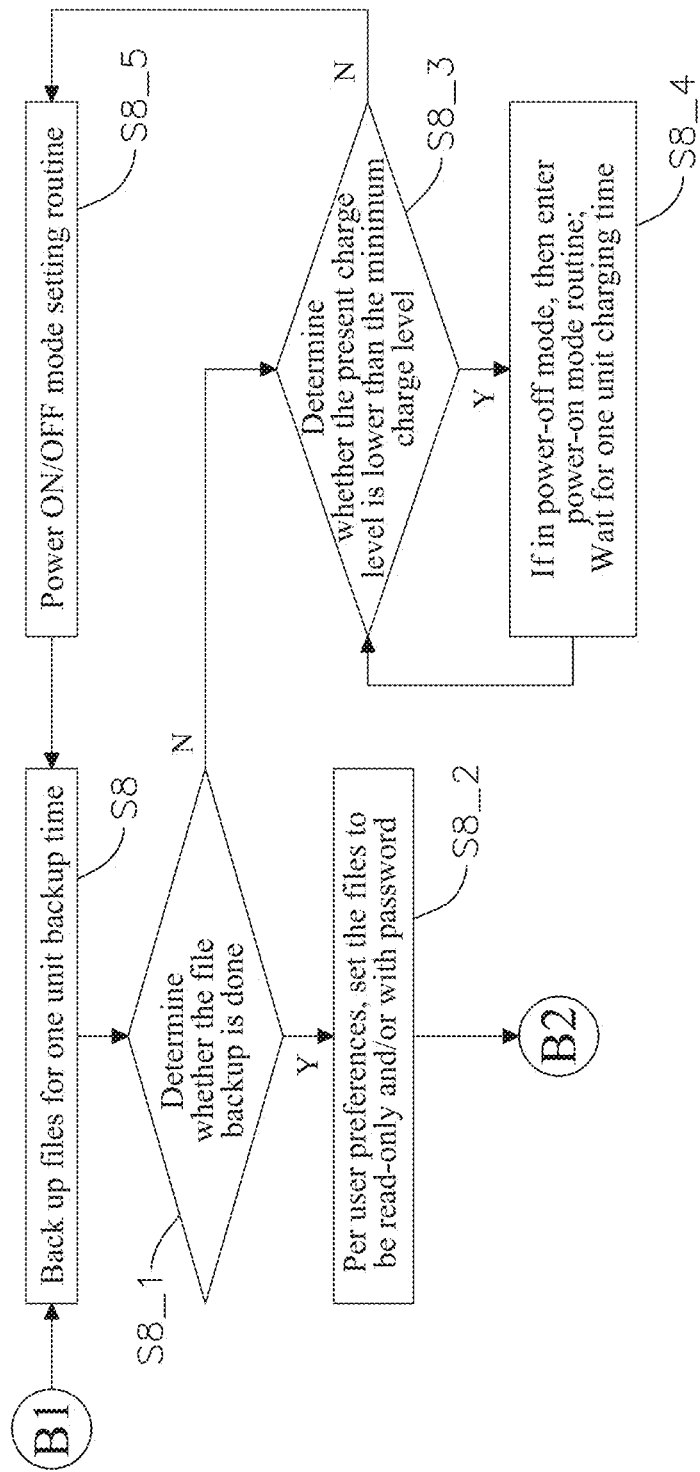

Next, in step 8 (S8) of FIG. 3C, the App 30 starts to back up files to be backed up from the mobile device 3 for a unit backup time such as 1 to 10 minutes, and then the flow jumps to step 8-1 (S8-1). Please note that if the file backup is done before the expiration of one unit backup time, then depending on implementations, either the process is pending until one unit backup time is expired or the process immediately proceeds to the next step.

Next, in step 8-1 (S8-1) of FIG. 3C, the App 30 determines whether the file backup is done, and if the file backup is done, the flow jumps to step 8-2 (S8-2) and if the file backup is not yet done, the flow jumps to step 8-3 (S8-3).

Next, in step 8-2 (S8-2) of FIG. 3C, the App 30 shall determine whether to set the files in the backup folder 176 as read-only, according to the backup folder read-only option data in the backup preferences 174, so as to avoid accidental deletion or malicious hacking of the files; and at the same time, the App 30 shall determine whether to set password protection for the files in the backup folder 176, according to the backup folder password option data in the backup preferences 174, so that a password can be required for opening the files, which further protects the files. Then, the flow jumps to step 9 (S9).

Next, in step 8-3 (S8-3) of FIG. 3C, the App 30 shall determine whether the present charge level is lower than the minimum charge level, and if the present charge level is higher than or equal to the minimum charge level, then the flow jumps to step 8-5 (S8-5).

Next, in step 8-4 (S8-4) of FIG. 3C, the App 30 shall determine whether the power-off mode is ongoing, and if the power-off mode is ongoing, the App enters the power-on mode routine; next, the App 30 waits for one unit charging time, and then the flow loops back to step 8-3 (S8-3).

Next, in step 8-5 (S8-5) of FIG. 3C, the App 30 starts to execute a power ON/OFF mode setting routine, and then the flow jumps back to step S8 (S8).

Next, in step 9 (S9) of FIG. 3B, the App 30 starts to execute the power ON/OFF mode setting routine.

Next, in step 10 (S10) of FIG. 3B, the App 30 shall wait for one unit charging time, and then the flow loops back to step 9 (S9).

Figure 3D:
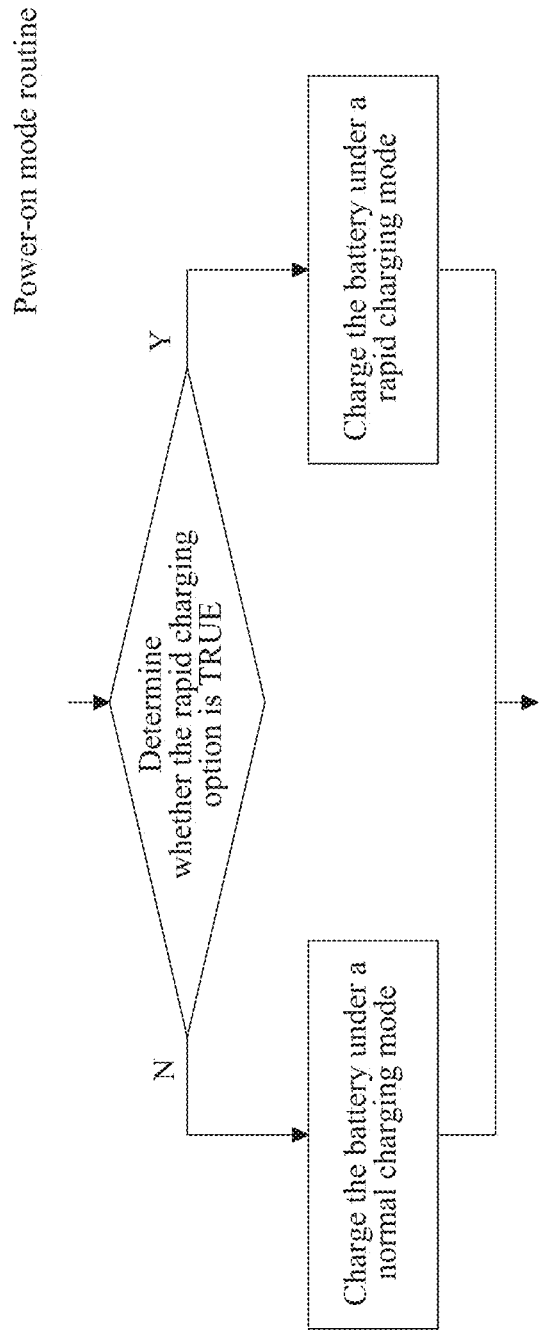

In FIG. 3D, the power-on mode routine is shown. The power-on mode routine includes the following actions: firstly, the App 30 determines whether the rapid charging option set by the charging preferences is TRUE, and if the rapid charging option is TRUE, the App 30 charges the battery under a rapid charging mode, otherwise if the rapid charging option is FALSE, the App 30 charges the battery under a normal charging mode. The power-on mode routine is used in step 4 (S4), step 8-4 (S8-4) and also in the power ON/OFF mode setting routine.

Figure 3E:
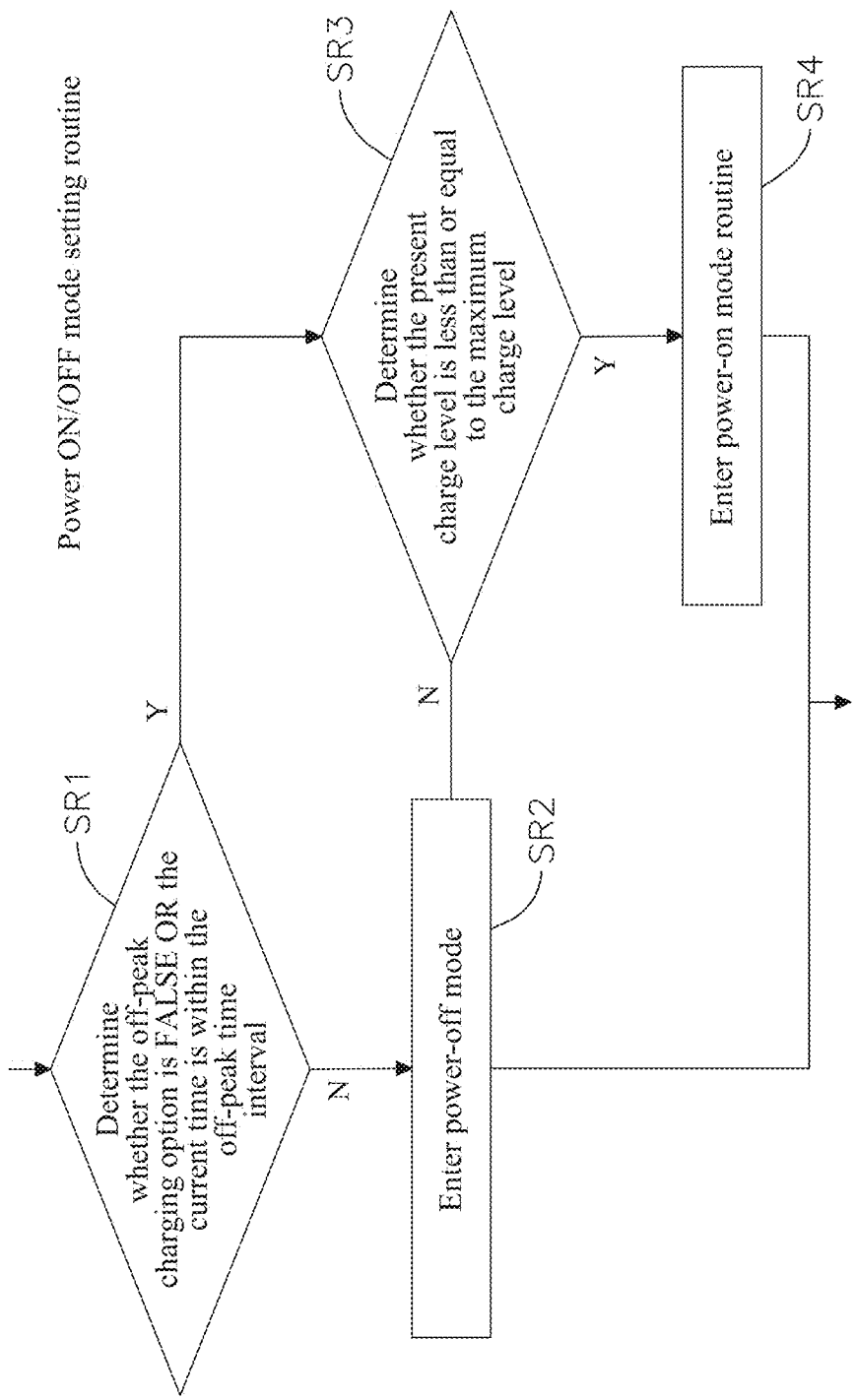

In FIG. 3E, the power ON/OFF mode setting routine is shown. The power ON/OFF mode setting routine includes the following steps:

SR1: The App 30 determines whether the off-peak charging option is FALSE or the current time is within the off-peak time interval, and if the off-peak charging option is FALSE or the current time is within the off-peak time interval, the flow jumps to step SR3;

SR2: The App 30 enters the power-off mode, i.e. the App 30 stops the data backup unit from charging the mobile device; and next, the flow exits the power ON/OFF mode setting routine;

SR3: The App 30 determines whether the present charge level is less than or equal to the maximum charge level, and if the present charge level is larger than the maximum charge level, the flow jumps to step SR2;

SR4: The App 30 enters the power-on mode routine; and next, the flow exits the power ON/OFF mode setting routine.

From the above steps of the method for a data backup unit to intelligently charge a mobile device of the present invention, it can be seen that after the data backup unit 1 is connected to the mobile device 3 and initialized, the App can make the data backup unit 1 and the mobile device 3 fully cooperate. Automatic charging can be accomplished and the file data accessible from the mobile device can be automatically backed up. This not only maintains the security of the data file stored on the mobile device, but also minimizes the burden upon the users and utility costs to back up data files accessible from the mobile device, therefore the urgent needs for intelligent charging methods which seamlessly incorporate the action of data backup can be achieved and the purpose of the present invention is fulfilled thereby.

The aforementioned are preferred embodiments of the present invention. It should be noted that for those of ordinary skill in the art, without departing from the principles of the present invention, certain improvements and retouches of the present invention can still be made which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for a data backup unit to intelligently charge a mobile device, the data backup unit having a memory unit which includes charging preferences and backup preferences, the mobile device having a battery and an application program (App), and the method including the following steps:

S3: the App determining whether a present charge level of the battery provided by the mobile device is lower than a minimum charge level set by the charging preferences, and if the present charge level is higher than or equal to the minimum charge level, the flow jumping to step S5;

S4: the App determining whether power-off mode is ongoing, and if power-off mode is ongoing, the App entering a power-on mode routine; waiting for one unit charging time, and then jumping to step S3;

S5: according to the charging preferences, the App estimating a charging time required to charge the battery to a maximum charge level and estimating a backup time required to complete the data backup, and then summing up the charging time and the backup time to get a required time interval;

S6: the App calculating an available time interval which is equal to a time difference between a current time provided by the mobile device and a usage starting time set by the charging preferences;

S7: the App determining whether the required time interval is less than the available time interval, if the required time interval is greater than or equal to the available time interval, jumping to step S9, and if the required time interval is less than the available time interval, jumping to step S8;

S8: the App backing up files to be backed up for the mobile device for a unit backup time;

S8-1: the App determining whether the file backup is done, and if the file backup is not yet done, the flow jumping to step S8-3;

S8-2: the App determining whether to set the files been backed up as read-only according to the backup preferences; and the App determining whether to set the files been backed up with password protection according to the backup preferences; the flow jumping to step S9;

S8-3: the App determining whether the present charge level is lower than the minimum charge level, and if the present charge level of the battery is higher than or equal to the minimum charge level, the flow jumping to S8-5;

S8-4: the App determining whether power-off mode is ongoing, and if power-off mode is ongoing, the App entering the power-on mode routine;

waiting for one unit charging time, and then looping back to step S8-3;

S8-5: the App starting to execute a power ON/OFF mode setting routine, and then jumping to step S8;

S9: the App starting to execute the power ON/OFF mode setting routine, and then jumping to step S10; and S10: the App waiting for one unit charging time, and then looping back to step S9.

2. The method as claimed in claim 1, wherein the power ON/OFF mode setting routine includes the following steps:

SR1: the App determining whether an off-peak charging option is FALSE or the current time is within an off-peak time interval, and if the off-peak charging option is FALSE or the current time is within the off-peak time interval, jumping to step SR3;

SR2: the App stopping the data backup unit from charging the mobile device, and next exiting the power ON/OFF mode setting routine;

SR3: the App determining whether the present charge level is less than or equal to the maximum charge level, and if the present charge level is larger than the maximum charge level, jumping to step SR2;

SR4: the App entering the power-on mode routine, and next exiting the power ON/OFF mode setting routine.

3. The method as claimed in claim 1, wherein the power-on mode routine includes the following actions:

the App determining whether a rapid charging option set by the charging preferences is TRUE, and if the rapid charging option is TRUE, charging the battery under a rapid charging mode, otherwise if the rapid charging option is FALSE, charging the battery under a normal charging mode.

4. The method as claimed in claim 2, wherein the power-on mode routine includes the following actions:

the App determining whether a rapid charging option set by the charging preferences is TRUE, if the rapid charging option is TRUE, charging the battery under a rapid charging mode, otherwise if the rapid charging option is FALSE, charging the battery under a normal charging mode.

5. The method as claimed in claim 1, wherein the following steps are further included before step S3:

S1: the App determining whether the mobile device has ever connected with the data backup unit; if the mobile device has ever connected with the data backup unit, the flow jumping to S2;

S1_1: the App creating a user profile block in the memory unit of the data backup unit, and setting up the backup preferences and the charging preferences in the user profile block;

S2: the App determining whether the mobile device has ever backed up files in the charging unit; if the mobile device has ever backed up files in the charging unit, the flow jumping to S3; and S2_1: the App creating a new backup folder in the memory unit.

6. The method as claimed in claim 1, wherein the charging preferences include a maximum charge level data, a minimum charge level data, a mobile device usage starting time data, an off-peak time interval data, the off-peak charging option, and a rapid charging option.

7. The method as claimed in claim 5, wherein, when the App creates a user profile block in the memory unit of the data backup unit, the App also writes an identification code of the mobile device into the user profile block.

8. The method as claimed in claim 5, wherein when the App creates a backup folder, the App also creates a backup folder pointer in the user profile block to point to the backup folder.

9. The method as claimed in claim 5, wherein the following steps are further included before step S1:

S0_0: the mobile device connected to the data backup unit and the connection being authenticated;

S0_1: the mobile device deciding whether the App has been installed, if the App is installed on the mobile device, then the mobile device executes step S1;

S0_2: the mobile device reminding the user of the mobile device to install the App.

* * * * *